United States Patent Office 2,757,162
Patented July 31, 1956

2,757,162

PROCESSING BUTADIENE-MONOVINYL-PYRIDINE RUBBERS

Louis H. Howland, Watertown, and Bernhard N. Larsen, West Haven, Conn., assignors to United States Rubber Company, New York, N. Y., a corporation of New Jersey No Drawing. Application December 15, 1954,
Serial No. 475,575

6 Claims. (Cl. 260—41.5)

This invention relates to an improvement in the processing of rubbery copolymers of butadiene and monovinylpyridines including both unsubstituted and lower alkyl-substituted mono-vinylpyridines. More particularly it relates to a technique whereby rubbery copolymers of butadiene and mono-vinylpyridines can be processed without the serious difficulties which have been encountered in the past. Still more particularly our invention relates to a method whereby rubbery copolymers of butadiene and mono-vinylpyridines can be readily broken down by mastication at elevated temperatures.

Although rubbery copolymers of butadiene and a mono-vinylpyridine have been known for some time, attempts to use them by conventional rubber processing techniques have presented considerable difficulty. The major difficulty has been that on mastication, either on the open rubber mill or in the Banbury mixer, at temperatures of the order of 250° F. or higher, they underwent rapid gel formation accompanied by a great increase in Mooney viscosity. Very frequently the rubber batch would harden up on the mill or in the Banbury mixer to such an extent that it had to be discarded. In fact, when efforts were made to process these rubbery copolymers in the rubber factory by ordinary rubber processing techniques a majority of the batches were ruined or even set on fire during the step of mastication commonly used to break down the rubber to facilitate the admixture with carbon black or like filler in the preparation of the carbon black master-batch. Whereas mastication at 250° F. or higher causes a break-down of the ordinary rubbery diene copolymers like natural rubber or GR–S, such hot mastication usually ruins a batch of a rubbery copolymer of butadiene and a mono-vinylpyridine especially under factory conditions. As a result, it is impossible to practice masticatory break-down of butadiene-vinyl-pyridine rubbery copolymers in the factory using the ordinary techniques known to the rubber worker. A very serious problem was thus presented which had to be solved if the many advantages of butadiene-vinyl-pyridine rubbery copolymer vulcanizates, especially for treads of pneumatic rubber tires, were to be realized commercially.

The principal object of the present invention is to provide a commercially feasible method of performing the hot break-down of rubbery copolymers of butadiene and mono-vinylpyridines. Another object is to prevent or greatly retard gel formation and increase in Mooney viscosity during the hot mastication of such rubbery copolymers. Another object is to provide a method of the foregoing type which is adapted to be carried out in the presence or absence of reinforcing carbon black. Numerous other objects of the present invention will more fully hereinafter appear.

Our invention is based upon the discovery that rubbery copolymers of butadiene and a mono-vinylpyridine can be broken down by mastication at elevated temperatures in the presence of relatively small amounts of a liquid composite acetone-diphenylamine condensate and relatively small amounts of 2,6-di-tertiary butyl para-cresol.

In the typical practice of our invention we masticate the rubbery copolymer of butadiene and a mono-vinyl-pyridine on the open rubber mill or in an internal mixer such as a Banbury mixer at a stock temperature of at least 250° F. in the presence of from 0.1 to 3.0 parts, per 100 parts of the copolymer, of a liquid composite acetone-diphenylamine condensate and in the presence of 2,6-di-tertiary butyl para-cresol in amount equal to from 0.1 to 3.0 parts per 100 parts of the copolymer. This mastication may be done in the presence or absence of the carbon black or other filler desired in the final compound.

It is preferred that the filler be present because the technique with the filler present during the hot mastication is conventionally practiced in many rubber plants and it is preferred in many cases to apply the same techniques which have been heretofore used in the processing of natural rubber and GR–S. The hot mastication is continued until the rubbery copolymer has been broken down to the desired extent, as measured by Mooney viscosity. If desired, the thus broken down rubbery copolymer can then be admixed with the carbon black or other filler after which the mixture can be further masticated at a temperature of 250° F. or higher. Alternatively the carbon black or other filler may be present from the start of the hot mastication. When filler is used, the mastication is of course continued until a uniform dispersion of the filler throughout the rubbery copolymer is attained.

The liquid composite acetone-diphenylamine condensation products used in our invention have been well known for many years, having been described in U. S. Patents 1,807,355 and 1,915,108 to Ter Horst, U. S. Patent 1,975,167 to Meuser and U. S. Patent 2,562,802 to Mankowich et al. These liquid composite condensates are sold under the trademark "BLE."

The 2,6-di-tertiary butyl para-cresol used in our invention is also a well known material, being available commercially under the trademark "Deenax."

The liquid composite acetone-diphenylamine condensate, or the 2,6-di-tertiary butyl para-cresol, or both, can be added to the butadiene-mono-vinylpyridine rubbery copolymer while the latter is in the latex form, i. e., prior to coagulation. Alternatively, one or both of these chemicals can be added to the solid rubbery copolymer, typically at the beginning of the hot mastication step. Although the amounts of each of these two materials can vary from 0.1 to 3.0 parts by weight per 100 parts of the rubbery copolymer, we typically employ approximately 1 part of each per 100 parts of the rubbery copolymer.

Although rubbery copolymers of butadiene and 2-methyl-5-vinylpyridine have been the most widely used of the butadiene-mono-vinylpyridine rubbery copolymers, we are not limited to such rubbery copolymers but can apply our invention to rubbery copolymers of butadiene and any other unsubstituted or lower alkyl ($C_1$ to $C_6$) substituted mono-vinylpyridine such as:

2-vinylpyridine
3-vinylpyridine
4-vinylpyridine
5-ethyl-2-vinylpyridine
2-methyl-6-vinylpyridine
2-ethyl-4-vinylpyridine The rubbery copolymers with which our invention deals are, as is well known, made by emulsion polymerization of the monomeric butadiene and mono-vinylpyridine followed by flocculation or coagulation, washing and drying. Typically, the relative proportions of combined monomers in the rubbery copolymer range from 5 to 50% of mono-vinylpyridine and correspondingly from 95 to 50% of butadiene.

The rubbery copolymer made from butadiene and a vinylpyridine may contain, as a result of the presence, in the monomer mixture subjected to polymerization of other unsaturated (reactive) monomers such as one or more dienes other than butadiene or one or more olefines with an end methylene group ($=CH_2$) such as styrene, acrylonitrile, etc. or a combination of such monomers. Also, the butadiene-vinylpyridine copolymer may be a product masterbatched in the latex state with various materials before flocculating and isolating the product.

Although our invention is often employed to effect the hot break-down of the rubbery copolymer by itself, i. e., in the absence of filler, if desired we can perform the hot mastication upon a mixture of the rubbery copolymer and rubber-reinforcing carbon black which typically is employed in an amount ranging from 25 to 100 parts of the rubbery copolymer. The application of our invention to mixtures of the rubbery copolymer and carbon black is especially advantageous because the presence of the carbon black normally tends to promote the formation of gel upon hot mastication of rubbery materials and thereby accentuates the need for our invention and because the presence of the carbon black causes a higher temperature to be attained during the mastication as a result of the reinforcing action of the black upon the rubbery copolymer which causes the temperature to build up to a greater extent than would otherwise be the case, again accentuating the need for our invention.

Our invention is especially advantageous when the mastication is carried out in the presence of carbon black and at temperatures of 300° F. or higher.

After mastication for the desired period of time, i. e., after the rubbery copolymer has been broken down to the desired extent and, in the case where the carbon black is present during the hot mastication, after the desired degree of dispersion of the carbon black in the rubbery copolymer has been achieved, the resulting mixture is cooled to below 250° F. whereupon it is compounded with additional compounding ingredients including a vulcanizing agent and an accelerator, together with other compounding ingredients as desired such as activators of acceleration, fillers such as carbon black (assuming that carbon black in the desired amount was not present during the heat treatment), softeners, anti-oxidants, etc. The temperature at which vulcanizing agents and accelerators are incorporated should be relatively low, i. e., not higher than 250° F. and usually not higher than 200° F., in order to avoid danger of scorching the mixture. The resulting mixture is then shaped and vulcanized in the usual way. We particularly prefer to build a tire in the conventional manner but using a tread stock made in accordance with our invention with carbon black loading after which the assembled tire is vulcanized in the conventional way.

The following examples illustrate our invention more fully. All parts are by weight. In these examples a copolymer of butadiene/2-methyl-5-vinylpyridine, polymerized at 41° F. and made from monomers in a 75/25 ratio, was used. In these examples, the hot break-down was performed in the absence of carbon black because it was desired to measure gel build-up in the rubber and it is not feasible to accurately measure gel build-up when carbon black is present.

*Examples 1 to 3*

Portions of a butadiene/2-methyl-5-vinylpyridine rubbery copolymer, which contained about 1% by weight of a liquid composite acetone-diphenylamine condensate ("BLE") added prior to coagulation, were masticated in a laboratory size B Banbury mixer in the presence of added oxygen with, respectively, none, one and two parts of "Deenax" per 100 parts of rubbery copolymer for four minutes at a stock temperature of approximately 250° F. The stock temperature was then raised to approximately 350° F. and the mixture was masticated for about ten minutes at 350° F., after which it was discharged. The following data were secured:

| Example | 1 | 2 | 3 |
|---|---|---|---|
| Butadiene 2-methyl-5-vinyl-pyridine rubbery copolymer (containing approximately 1% of "BLE" added before coagulation) | 100 | 100 | 100 |
| "Deenax" | | 1 | 2 |

The above compositions were pre-mixed 4 minutes at 250° F. in a laboratory Banbury; after pre-mixing they had these properties:

| | | | |
|---|---|---|---|
| 212° F. Mooney viscosity | 45 | 40 | 40 |
| Percent B gel [1] | 0 | 0 | 0 |

[1] That portion of a rubber which will not dissolve in the best solvent for the rubber after ten tight refinings on a cold 2-roll mill.

The above mixtures were then subjected to the hot Banbury treatment under the following conditions and with the following results:

| | | | |
|---|---|---|---|
| Stock temperature (° F.) | 350 | 350 | 350 |
| Time, minutes | 10 | 10 | 10 |
| Rotor, R. P. M. during rise | 150 | 150 | 150 |
| Rotor, R. P. M. (steady) | 100 | 100 | 100 |
| Oxygen gas fed into Banbury | Yes | Yes | Yes |
| Dump Temperature (° F.) | 285 | 280 | 250 |
| 212° F. Mooney viscosity | 36 | 22 | 16 |
| Decrease in Mooney viscosity | 9 | 18 | 24 |
| Percent B gel | 39 | 3 | 0 |

Comparison of Example 2, which contained 1 part of "Deenax" in addition to the "BLE" already present in the rubbery copolymer, with Example 1 which contained only the "BLE," shows two definite effects: (1) a greater decrease in Mooney viscosity which means a greater break-down of the rubber, and (2) the virtual elimination of B gel formation during the high temperature Banbury operation.

Comparison of Example 3 with Example 1 shows the same phenomenon but to an even greater degree.

Oxygen was used in Examples 1 to 3 because oxygen greatly accelerates the speed of break-down, with the result that the effect of the presence and absence of the "Deenax" was accentuated. In the practice of our invention the stocks prepared as in Examples 2 and 3 are commingled in the conventional manner with carbon black, sulfur, accelerators, activators of vulcanization, etc., formed into tire treads and vulcanized in the conventional way.

*Examples 4 to 6*

In this series of examples a different lot of butadiene/2-methyl-5-vinylpyridine (75/25) rubbery copolymer, also containing approximately 1% of "BLE" added prior to coagulation, from that used in Examples 1 to 3, was used. Example 4 was the first control and shows that when such a rubbery copolymer is milled on a 6 inch 2-roll laboratory rubber mill at 200° F. there is no break-down but on the contrary the Mooney viscosity increases. In Example 5, a second control, one part of "BLE" was used in addition to that already present in the rubber. In Example 6, the milling was done in the presence of one part of added "Deenax." The data were as follows:

| Example | 4 | 5 | 6 |
|---|---|---|---|
| Butadiene/2-methyl-5-vinylpyridine rubbery copolymer (containing about 1% "BLE") | 100 | 100 | 100 |
| "BLE" | | 1 | |
| "Deenax" | | | 1 |

|  | 212° F. Mooney Viscosity | | |
|---|---|---|---|
| 300° F. Milling, Min. 0 | 51 | 48 | 49 |
| 300° F. Milling, Min. 2 | 55 | 48 | 47 |
| 300° F. Milling, Min. 4 | 49 | 49 | 45 |
| 300° F. Milling, Min. 6 | 56 | 53 | 43 |
| 300° F. Milling, Min. 10 | 62 | 54 | 45 |
| 300° F. Milling, Min. 15 | 67 | 60 | 42 |
| Increase in Mooney Viscosity | +16 | +12 |  |
| Decrease in Mooney Viscosity |  |  | −7 |

From the data just given it will be seen that the first control, Example 4, which contained only 1 part of "BLE," underwent a considerable increase in viscosity during 15 minutes milling at 300° F. in air. This is illustrative of the trouble which occurred frequently in factory processing prior to the present invention; i. e., the rubber got stiffer and stiffer and at the same time the processing temperature increased because of the greater power requirements with a given piece of equipment. This would result eventually, at a temperature of 450° F. in spontaneous ignition or premature vulcanization. The same difficulty is encountered when additional "BLE" is added to the rubber as in Example 5. On the contrary, the Mooney viscosity decreased during 15 minutes milling at 300° F. in air in Example 6, which contained 1 part of "Deenax" in addition to the "BLE." Example 6 illustrates satisfactory processing because the Mooney viscosity decreases with increasing time of processing at high temperature. Thus, the danger of ignition of or of premature vulcanization ("scorching") of a tread mixture is practically eliminated.

Example 7

The butadiene-2-methyl-5-vinylpyridine rubbery copolymer, again containing 1% of "BLE" added before flocculation, was masticated under factory conditions in a No. 11 Banbury mixer preparatory to preparing a tire tread stock. To greatly retard gelling of the rubbery copolymer during the mastication, which was performed for the purpose of obtaining improved processing of the subsequently mixed tread stocks, 1 part of "Deenax" per 100 parts of rubber copolymer was added early in the plasticization cycle in the Banbury. Typical Banbury plasticization cycles were as follows:

| #11 Banbury—Low Speed | | #11 Banbury—High Speed | |
|---|---|---|---|
| Minutes: | | Minutes: | |
| 0 | load cold rubber. | 0 | load cold rubber. |
| ½ | add "Deenax"—mix. | ½ | add "Deenax"—mix. |
| 8 | discharge at 280–300° F. stock temperature. | 5 | discharge at 280–300° F. stock temperature. |

In practicing our invention, the mixture of the rubbery copolymer, the liquid condensate and the 2,6-di-tertiary butyl para-cresol, with or without carbon black, is almost invariably masticated at a stock temperature substantially above 250° F., typically 275° F. or higher, until a substantial reduction in the viscosity of the rubbery copolymer has been achieved. Generally the mastication is continued until a reduction of at least 10% in the Mooney viscosity of the rubbery copolymer content of the mixture has been effected, and more commonly until a reduction therein of at least 25% has been achieved.

As indicated above, the high temperature breakdown of the butadiene-vinylpyridine rubbery copolymer in accordance with our invention can be performed in the presence or absence of rubber-reinforcing carbon black. It is often the practice in the rubber art to prepare a carbon black masterbatch by masticating the rubber and the carbon black at high temperature, it being generally considered that such high temperature mastication brings about optimum reinforcement by the carbon black. The reinforcing carbon blacks, which can be used in this aspect of our invention, are the channel blacks and the oil furnace blacks. The high temperature mastication of the mixture of carbon black and the rubber is continued until the black is well dispersed and a uniform, readily processed mixture is obtained whereupon the stock is cooled preparatory to the incorporation of conventional vulcanizing and other desired compounding ingredients, followed by shaping and vulcanizing in the usual way.

Having thus described our invention, what we claim and desire to protect by Letters Patent is:

1. The method which comprises masticating a rubbery copolymer of butadiene and a mono-vinylpyridine at a stock temperature of at least 250° F. in the presence of a liquid composite acetone-diphenylamine condensate in amount equal to from 0.1 to 3.0 parts per 100 parts of said copolymer and in the presence of 2,5-di-tertiary butyl paracresol in amount equal to from 0.1 to 3.0 parts per 100 parts of said copolymer, continuing said masticating until the Mooney viscosity of said copolymer has been substantially lowered, cooling the resulting mixture, intimately incorporating therewith at a relatively low temperature compounding ingredients including a vulcanizing agent and an accelerator, shaping the resulting mixture, and vulcanizing the shaped mixture.

2. The method which comprises masticating a rubbery copolymer of butadiene and 2-methyl-5-vinylpyridine at a stock temperature of at least 250° F. in the presence of a liquid composite acetone-diphenylamine condensate in amount equal to from 0.1 to 3.0 parts per 100 parts of said copolymer and in the presence of 2,5-di-tertiary butyl para-cresol in amount equal to from 0.1 to 3.0 parts per 100 parts of said copolymer, continuing said masticating until the Mooney viscosity of said copolymer has been substantially lowered, cooling the resulting mixture, intimately incorporating therewith at a relatively low temperature compounding ingredients including a vulcanizing agent and an accelerator, shaping the resulting mixture, and vulcanizing the shaped mixture.

3. The method which comprises masticating a rubbery copolymer of butadiene and 2-methyl-5-vinylpyridine at a stock temperature of at least 300° F. in the presence of a liquid composite acetone-diphenylamine condensate in amount equal to approximately 1 part per 100 parts of said copolymer and in the presence of 2,5-di-tertiary butyl para-cresol in amount equal to approximately 1 part per 100 parts of said copolymer, continuing said masticating until the Mooney viscosity of said copolymer has been substantially lowered, cooling the resulting mixture, intimately incorporating therewith at a relatively low temperature compounding ingredients including a vulcanizing agent and an accelerator, shaping the resulting mixture, and vulcanizing the shaped mixture.

4. The method which comprises masticating a rubbery copolymer of butadiene and a mono-vinylpyridine in admixture with from 25 to 100 parts of rubber-reinforcing carbon black per 100 parts of said copolymer at a stock temperature of at least 250° F. in the presence of a liquid composite acetone-diphenylamine condensate in amount equal to from 0.1 to 3.0 parts per 100 parts of said copolymer and in the presence of 2,5-di-tertiary butyl para-cresol in amount equal to from 0.1 to 3.0 parts per 100 parts of said copolymer, continuing said masticating until the Mooney viscosity of said copolymer has been substantially lowered, cooling the resulting mixture, intimately incorporating therewith at a relatively low temperature compounding ingredients including a vulcanizing agent and an accelerator, shaping the resulting mixture, and vulcanizing the shaped mixture.

5. The method which comprises masticating a rubbery copolymer of butadiene and 2-methyl-5-vinylpyridine in admixture with rubber-reinforcing carbon black in amount equal to from 25 to 100 parts per 100 parts of said copolymer at a stock temperature of at least 250° F. in the presence of a liquid composite acetone-diphenylamine condensate in amount equal to from 0.1 to 3.0 parts per 100 parts of said copolymer and in the presence of 2,5-di-tertiary butyl para-cresol in amount equal to from 0.1 to 3.0 parts per 100 parts of said copolymer, continuing said masticating until the Mooney viscosity of said copolymer has been substantially lowered, cooling the resulting mixture, intimately incorporating therewith at a relatively low temperature compounding ingredients including a vulcanizing agent and an accelerator, shaping the resulting mixture, and vulcanizing the shaped mixture.

6. The method which comprises masticating a rubbery copolymer of butadiene and 2-methyl-5-vinylpyridine in admixture with rubber-reinforcing carbon black in amount equal to from 25 to 100 parts per 100 parts of said copolymer at a stock temperature of at least 300° F. in the presence of a liquid composite acetone-diphenylamine condensate in amount equal to approximately 1 part per 100 parts of said copolymer and in the presence of 2,5-ditertiary butyl para-cresol in amount equal to approximately 1 part per 100 parts of said copolymer, continuing said masticating until the Mooney viscosity of said copolymer has been substantially lowered, cooling the resulting mixture, intimately incorporating therewith at a relatively low temperature compounding ingredients including a vulcanizing agent and an accelerator, shaping the resulting mixture, and vulcanizing the shaped mixture.

References Cited in the file of this patent
UNITED STATES PATENTS

| | | |
|---|---|---|
| 2,640,042 | Howland et al. | May 26, 1953 |
| 2,656,324 | Te Grotenhuis | Oct. 20, 1953 |

UNITED STATES PATENT OFFICE
CERTIFICATE OF CORRECTION

Patent No. 2,757,162

July 31, 1956

Louis H. Howland et al.

It is hereby certified that error appears in the printed specification of the above numbered patent requiring correction and that the said Letters Patent should read as corrected below.

Column 6, lines 14 and 15, for "2,5-di-tertiary butylparacresol" read -- 2,6-di-tertiary butyl para-cresol --; same column 6, lines 28 and 29, 42 and 43, line 58, lines 74 and 75, and column 7, line 15 to column 8, line 1, for "2,5-di-tertiary butyl para-cresol", each occurrence, read -- 2,6-di-tertiary butyl para-cresol --.

Signed and sealed this 7th day of April 1959.

(SEAL)
Attest:

KARL H. AXLINE
Attesting Officer

ROBERT C. WATSON
Commissioner of Patents